United States Patent [19]
Gnadt

[11] Patent Number: 5,538,462
[45] Date of Patent: Jul. 23, 1996

[54] LAPPING COMPOUND SUPPLY SYSTEM FOR A GEAR FINISHING MACHINE

[75] Inventor: James J. Gnadt, Fairport, N.Y.

[73] Assignee: The Gleason Works, Rochester, N.Y.

[21] Appl. No.: 213,319

[22] Filed: Mar. 15, 1994

[51] Int. Cl.$^6$ .................................................. B24B 15/00
[52] U.S. Cl. ............................ 451/114; 451/28; 451/60
[58] Field of Search ............................ 451/114, 28, 446, 451/60, 36, 53, 47, 99

[56] References Cited

U.S. PATENT DOCUMENTS

| | | |
|---|---|---|
| 1,796,484 | 3/1931 | Slade . |
| 1,925,751 | 9/1933 | Diffenderffer ............................ 451/446 |
| 2,541,283 | 2/1951 | Praeg . |
| 2,691,250 | 10/1954 | McMullen et al. . |
| 2,904,934 | 5/1956 | Schicht ................................... 451/114 |
| 3,162,986 | 1/1963 | Olivieri ..................................... 451/60 |
| 3,717,958 | 2/1973 | Ellwanger et al. ...................... 451/114 |
| 4,513,894 | 4/1985 | Doyle et al. . |
| 4,754,437 | 6/1988 | Doom et al. . |
| 4,784,295 | 11/1988 | Holmstrand ............................. 451/446 |
| 5,283,989 | 2/1994 | Hisasue et al. ............................ 451/99 |

FOREIGN PATENT DOCUMENTS

| | | |
|---|---|---|
| 339374 | 6/1904 | France . |
| 2578470 | 9/1986 | France . |
| 3246761 | 6/1984 | Germany . |
| 3545328 | 6/1987 | Germany . |
| 1502285 | 8/1989 | U.S.S.R. ................................. 451/446 |
| 1546236 | 2/1990 | U.S.S.R. ................................. 451/446 |

*Primary Examiner*—Bruce M. Kisliuk
*Assistant Examiner*—Derris H. Banks
*Attorney, Agent, or Firm*—Robert L. McDowell; Ralph E. Harper

[57] ABSTRACT

A lapping compound mixing and supply system wherein lapping compound is recirculated to the mixing vessel when not supplied to the lapping chamber of a machine tool such as a gear lapping machine. Lapping compound is pumped at about a first range of pump speeds to the lapping chamber, however, when no lapping is being performed, lapping compound is pumped at about a second, decreased range of pump speeds through a recirculating conduit and introduced into the mixing vessel along the conical bottom surface of the vessel. The introduction of lapping compound in this manner, along with the action of an rotating impeller in the vessel, provides improved mixing of the lapping compound and homogenizes the temperature thereof.

29 Claims, 3 Drawing Sheets

LAPPING COMPOUND SUPPLY SYSTEM FOR A GEAR FINISHING MACHINE

FIELD OF THE INVENTION

The present invention is directed to gear finishing machines and in particular to a system for supplying lapping compound to gear finishing machines.

BACKGROUND OF THE INVENTION

Lapping is the process wherein fine abrasive particles suspended in a carrier substance are utilized to abrade the surface of a workpiece.

In the gear finishing process of lapping, an abrasive mixture, referred to as lapping compound, is introduced to the meshing tooth surfaces of two gears under load conditions. The application of the lapping compound is usually through nozzles near the meshing point of the teeth with the flow rate, pressure, temperature and consistency of the compound being significant factors in the effectiveness of the delivery system.

One such delivery system is shown in U.S. Pat. No. 2,541,283 to Praeg wherein delivery of the lapping compound is provided by a suspended tank containing a plunger to force compound through a tube to a nozzle adjacent the gears to be lapped.

Another method of delivering lapping compound to the lapping chamber of a gear finishing machine is disclosed by U.S. Pat. No. 1,796,484 to Slade. Lapping compound is pumped from a reservoir via a flexible hose to a nozzle. The lapping chamber includes a drain connected to a pipe to return the lapping compound to the reservoir after it has been applied to the gears being lapped.

U.S. Pat. No. 2,691,250 to McMullen et al. teach a lapping compound mixing and delivery system comprising a mixing tank having two paddle wheels. The tank is connected, via a trap, to a pump for providing lapping compound to the lapping chamber. The trap is intended to prevent abrasive material that settles out of suspension during times when the machine is not operating, from entering the pump.

The matter of particles settling out of suspension during times of no machine operation is discussed in U.S. Pat. No. 4,513,894 to Doyle et al. A supply system for delivering abrasive slurry to a polishing or grinding machine for metallurgical specimens includes a valve to direct the abrasive slurry back into the holding tank to assist in mixing the abrasive slurry when the machine is not operating. However, injecting compound at the top of the tank produces little mixing action. Furthermore, Doyle et al. disclose a sharp-cornered, flat bottom tank. In tanks with corners and flat bottoms, particles have a tendency to settle in the corners at the tank bottom and Doyle et al. teach no significant means to effect a complete mixing action to keep all abrasive particles in suspension in the tank. No manner of providing heat to the system is mentioned.

The primary factor in the successful application of lapping compound is to effectively control the consistency of the mixture. This involves temperature control (near 100 degrees Fahrenheit) to affect viscosity which in turn impacts the ability of the compound to flow through the dispensing medium, and mixing the compound to keep the abrasives in suspension with the oil, countering the tendency of the abrasives to settle out of the medium and rendering the compound as delivered to the application as weakened and, therefore, ineffective.

In most pumping systems, two types of pumps are generally utilized, electrical-driven centrifugal open impeller type or pneumatic type. Either type has been prone to failure due to conditions relating to the compound or its application.

The open impeller centrifugal type has experienced a short service life due to abrasion of the impeller. The open impeller design produces flow by forcing the fluid between the impeller vanes and the pump housing. Any influence of the compound to abrade and erode these surfaces causes increased clearances, deteriorates the impelling surfaces, and directly decreases the capacity of the pump.

Pressure of the fluid in the discharge port of the pump, caused by restrictions and valves in the delivery system, further accelerate the wear in there areas due to increased internal slippage. This phenomenon causes a premature dulling of the compound abrasives themselves, limiting their usefulness as a lapping medium, and creating heat which must be dissipated to the extent the compound temperature exceeds the desired value. In effect, pumping of the compound with this pump design causes an immediate and progressive decay in the output volume until the pump becomes ineffective for application.

Additionally, the entire pump must be replaced to effect repair since the pump housing is generally worn. This failure of the pump can occur in as little as 1000 production hours.

The diaphragm pump causes flow by alternating pneumatic force to diaphragm cavities. Through the use of valves, the progressive movement of these diaphragms displaces the fluid into the discharge port and to the application. The pump only displaces the fluid which will flow through the application and therefore does not generate heat through internal slippage as is typical with the centrifugal type. Additionally, the control of the flow rate can be easily regulated by adjusting the pneumatic force applied to the diaphragms.

Diaphragm pumps are prone to frequent failure due to rupture of the diaphragm because of fatigue, failure of the valves regulating flow to the diaphragm due to abrasion, and, failure of the pneumatic valves sequencing the diaphragm actuations as a result of moisture and rust in the supplied air.

A major source of failure in any lapping compound supply system is the presence of metal chips from the workpieces which find their way into the lapping compound. In some instances, workpieces, especially gears, are not chamfered to remove burrs after cutting. When such workpieces are heat treated, burrs that are present become very hard and sharp. These burrs are removed from the workpiece by the lapping process and subsequently make their way through the compound supply system causing damage to the pump, especially to diaphragms which are easily punctured, clogging the valves and piping system, or, ruining other workpieces by being reintroduced into the lapping chamber along with the lapping compound.

It is an object of the present invention to eliminate the need for separate mixing and pumping devices while improving the temperature and dispersion homogenization of the lapping compound.

It is another object of the present invention to increase pump service life, improve temperature control of the compound, and allow easier access to the reservoir for cleaning.

It is a further object of the present invention to eliminate any requirement for pneumatic service to the pumping system.

SUMMARY OF THE INVENTION

The present invention comprises an apparatus for supplying abrasive compound to a machine tool. The apparatus comprises a holding and mixing vessel having a pair of opposed ends with each of the ends having an interior surface. The interior surface of one of the ends is generally conically shaped whereby the interior height of the vessel increases toward the center of the vessel. The vessel also includes a pump means, connected to an outlet means to convey abrasive compound from the vessel, and a mixing means, located adjacent to the conically shaped interior surface and generally conforming therewith.

The outlet means is connected to a manifold for controlling the flow of abrasive material to at least one of the machine tool and one or more recirculating conduits. The recirculating conduit extends from the manifold to the vessel and is connected to the vessel in a manner to introduce abrasive compound along the conical shaped interior surface and effect a mixing action of abrasive compound in the vessel as well as homogenization of the temperature of the entire supply system when abrasive compound is conveyed through the conduit. The vessel further includes means to receive abrasive compound from the machine tool.

More specifically, the present invention contemplates the combination of a gear finishing machine and a lapping compound supply system. The gear finishing machine being of the type wherein finish machining of the tooth surfaces of at least one work gear is facilitated at least in part by a lapping compound.

The supply system comprises a holding and mixing vessel having a pair of opposed ends. The interior surface of one of the ends is generally conically shaped with the interior height of the vessel increasing toward the center of said interior surface.

The vessel includes a pump connected to an outlet conduit to convey abrasive compound from the vessel. The vessel also includes an impeller mixing means located adjacent the conically shaped interior surface with the impeller means having a shape generally conforming with the conical surface.

The outlet conduit is connected to a manifold comprising at least one valve for controlling the flow of the abrasive material to at least one of a lapping chamber of the gear finishing machine and one or more recirculating conduits. The recirculating conduit extending from the manifold to the vessel is connected to said vessel in a manner to introduce lapping compound along the conical shaped interior surface thereby effecting a swirling mixing action of abrasive compound in said vessel as well as homogenizing the temperature of the compound in the entire supply system when abrasive compound is conveyed through the recirculating conduit.

The vessel includes an inlet connected to a return conduit extending from the lapping chamber to return abrasive compound from the lapping chamber to the holding and mixing vessel.

DETAILED DESCRIPTION OF THE PREFERRED EMBODIMENTS

The present invention will now be described with reference to the accompanying Drawings.

Figure 1:
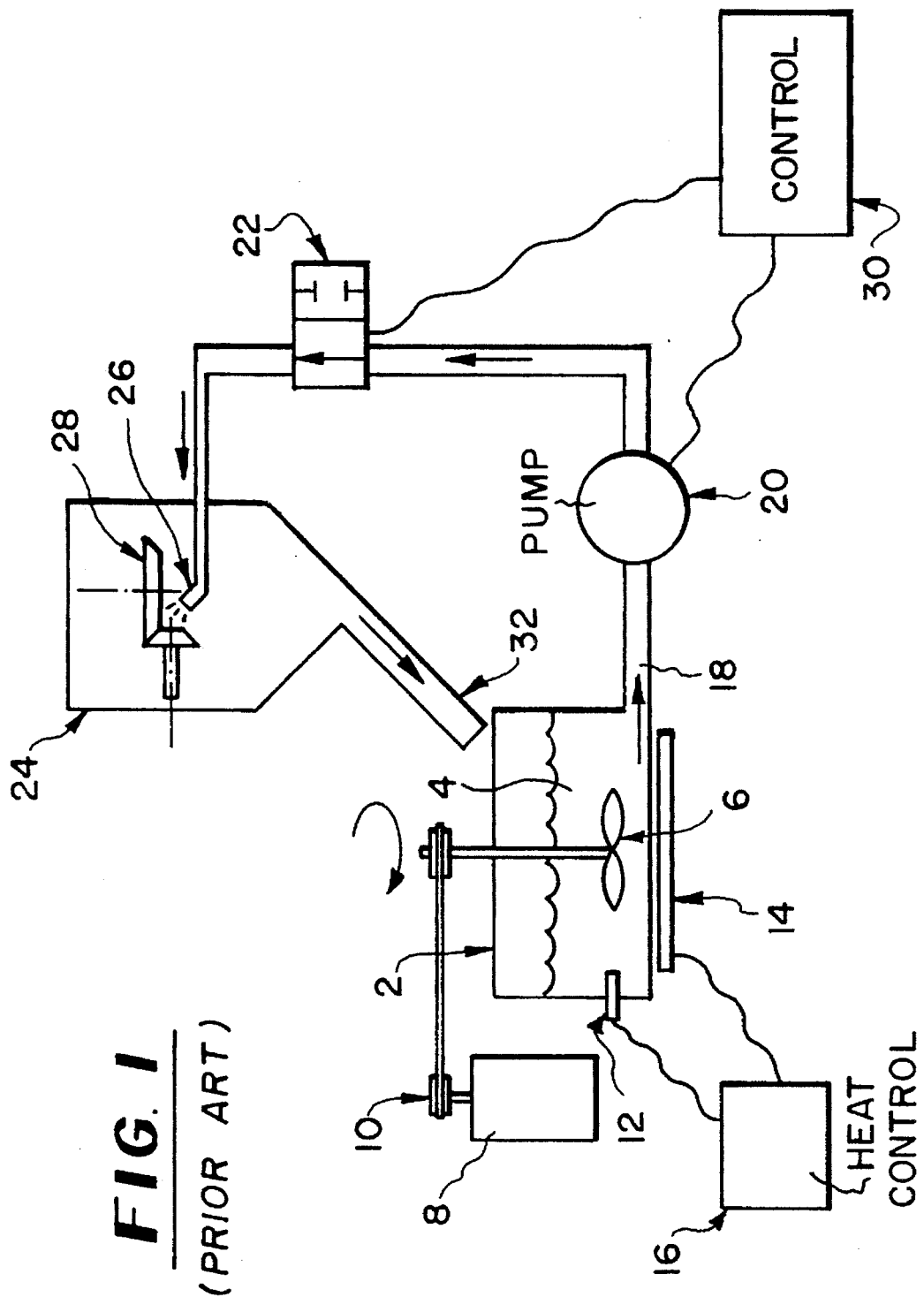
FIG. 1 is a schematic illustration of a known lapping mixing and supply system.

FIG. 1 is a schematic representation of a prior art lapping compound supply system. The known system includes a tank or reservoir 2 containing an amount of lapping compound 4 usually comprising petroleum oil carrying abrasive solids. The tank 2 includes a mixer 6 driven by a mixing motor 8 and drive train 10. Associated with the tank 2 is a temperature sensor 12, heating element 14 (usually electrical) and heating control 16.

The supply system further includes an outlet pipe 18 extending from the tank 2 to a pump 20 which usually is a pneumatic type or an electrical-driven centrifugal open impeller type. From pump 20, lapping compound is pumped to a flow valve 22 and on to the lapping chamber 24 where it is discharged through a discharge device 26 at the workpieces 28. The operation of the pump 20 and flow valve 22 are controlled by a control system 30. Lapping compound is returned to the tank 2 by a gravity return pipe 32.

In systems such as shown in FIG. 1, settling of the abrasive out of suspension in the carrier medium is prone to occur especially when lapping is not being performed. At these times the flow valve 22 is closed thus there is no flow of lapping compound through the supply system. Also in this situation, compound in the piping system tends to cool, thereby increasing the viscosity, and making subsequent flow through the system difficult if not impossible.

In tanks having corners, settling takes place along the bottom of the tank at the corners since the mixer 6 is generally ineffective in keeping the compound completely mixed throughout the tank 2.

Furthermore, excess heat may build up due to the pump 20 running at high speed causing the compound to overheat and reducing its effectiveness. Constantly running the pump 20 at the necessary high pumping speed (about 1200–1750 RPM for electrical pumps) results in accelerated wear of the pump components.

Figure 2:
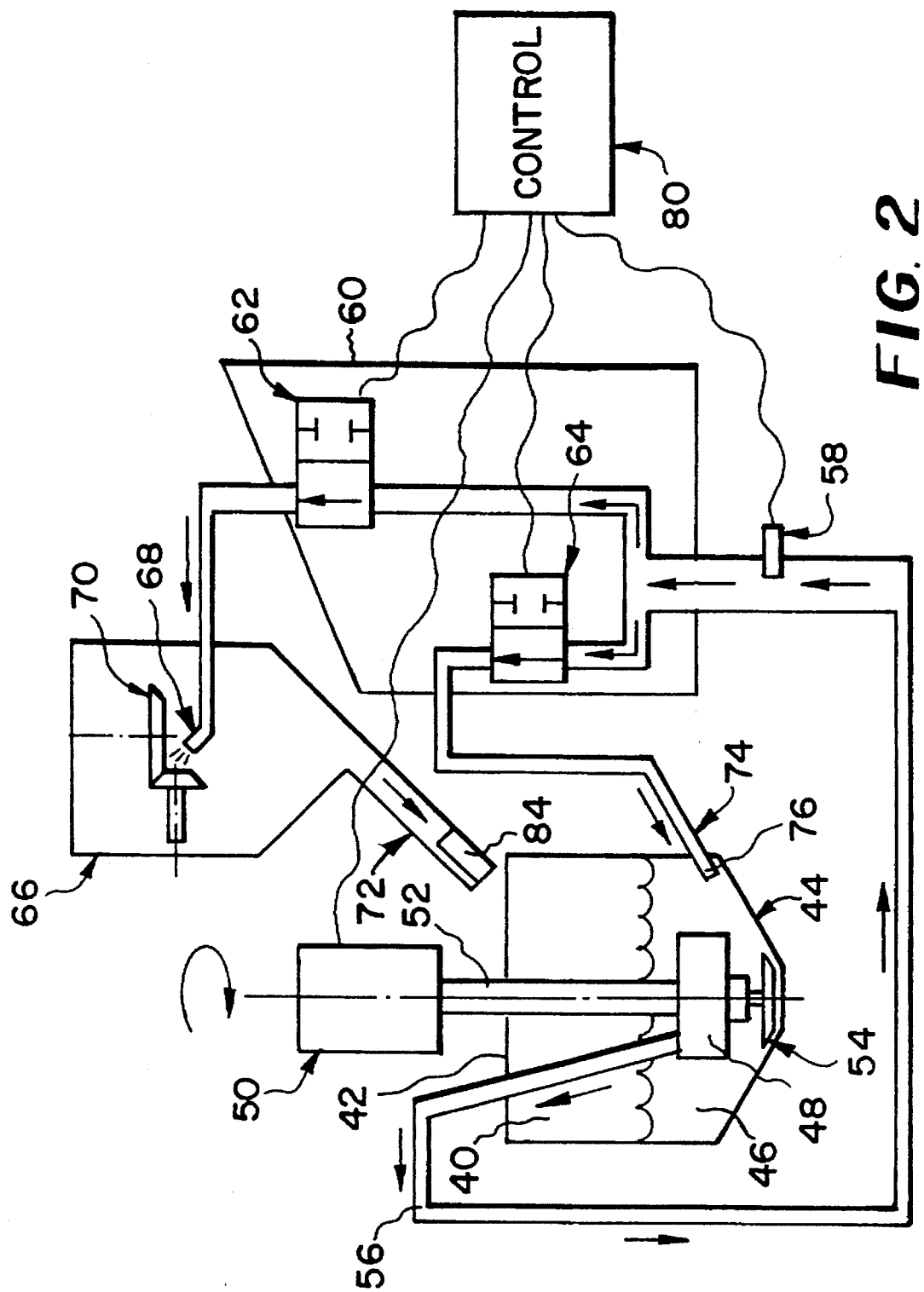
FIG. 2 is a schematic representation of the mixing and supply system of the present invention.

The lapping compound supply system of the present invention is shown in FIG. 2. The system comprises a vessel or reservoir 40 preferably having a generally cylindrical shape. The vessel 40 includes a cover 42 and a bottom 44 having at least a conical inside surface with the height of the vessel 40 being greatest near the center of the vessel. The vessel 40 contains an amount of lapping compound 46.

Located in the vessel 40 is a pumping means 48, preferably an electrical driven closed impeller type pump. A motor 50 capable of variable speeds, and preferably electric, drives the pump 48 via a shaft 52. The shaft 52 may be coupled to motor 50, or, may be an extension of the motor shaft. The shaft 52 extends beyond the pump means 48 where a mixer 54 is also attached to the shaft 52. Therefore it can be seen that the pump and the mixer are driven by a single motor 50.

Lapping compound is pumped through outlet conduit 56 to manifold 60 where the direction of flow is split. A temperature sensor 58 is preferably located in outlet conduit 56. Manifold 60 preferably comprises at least two valves, flow valve 62 and diverter valve 64. Flow valve 62 directs compound to the lapping chamber 66 of the gear finishing machine and discharges the compound through discharge device 68, such as a nozzle, at the workpieces 70 which may be a gear set such as a set of bevel gears. Lapping compound then returns to the vessel 40 by a gravity return 72. More than one flow valve 62 may be utilized if more than one discharge device 68 is desired.

In those instances where lapping compound need not be supplied to chamber 66, such as when workpieces are being loaded and/or unloaded, valve 62 is closed and diverter valve 64 is opened to recirculate lapping compound through recirculating conduit 74 and introduce the compound into the vessel 40 through nozzle 76 located along the conical surface 44. Introduction of lapping compound into the vessel in this manner creates a swirling motion within the vessel. The combined effects of the mixer 54 and the nozzle 76 assures homogenization of all the compound in the vessel by maintaining a continual state of motion to keep the abrasive particles in suspension. Also, the combined effects of the mixer 54 and the nozzle 76 assures homogenization of the compound temperature in the entire system due to the continual mixing action and movement of the compound through the supply system.

Control of the motor 50, valves 62 and 64, and monitoring of the temperature sensor 58 are controlled by a control system 80 such as a computer numerical control (CNC) system.

Figure 3:
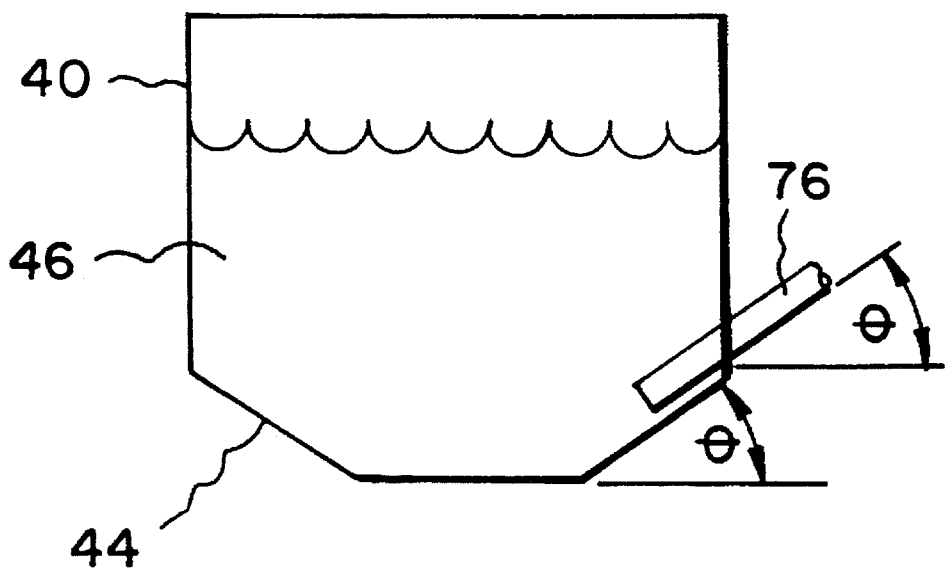
FIGS. 3 and 4 illustrate the orientation of the recirculating nozzle in the mixing vessel of the present invention.

FIG. 3 is a cross-sectional view of vessel 40 and shows a preferred orientation for introducing lapping compound into vessel 40 through recirculating nozzle 76. Preferably the angle of inclination of the conical surface 44 of the vessel 40, angle θ, is about 25 degrees. It is preferred that the nozzle 76 be oriented at approximately the same angle θ as the angle of inclination of the conical surface 44.

It is to be understood that although one nozzle 76 and recirculating conduit 74 are shown, the present invention contemplates any number of diverter valves, recirculating conduits, and nozzles with the nozzles being arranged about the vessel 40 in any desired manner.

Figure 4:
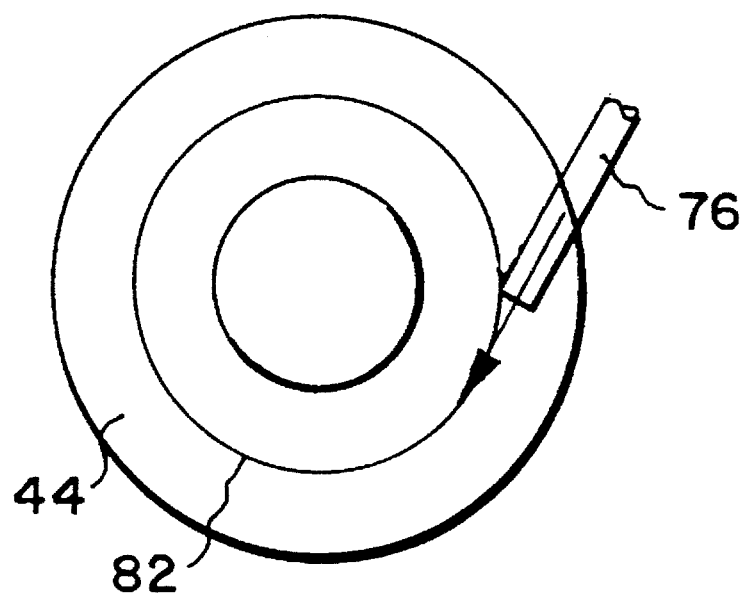

Furthermore, it is preferred that the flow of lapping compound from nozzle 76 be directed tangent to a reference circle 82, as shown by the top view of the vessel 40 in FIG. 4. The imaginary circle 82 is located midway along the conical surface 44 between the side of the vessel 40 and the generally flat bottom of the central portion of the vessel.

The lapping compound supply system of the present invention integrates the pump 48, mixer 54, and temperature control into a single entity. A closed impeller type centrifugal pump 48 with integral electric motor 50 is submerged directly into the vessel 40 and includes a low pitch angle stirrer 54 attached directly to the main shaft 52. The low pitch angle (preferably about one-eighth inch pitch) of stirrer 54 is utilized to prevent cavitation associated with high speed operation. The conical surface 44 of the vessel directs compound toward the central bottom area where the pump suction port resides. Preferably, the shaft 52 is made of steel and the pump impeller is made of cast steel.

Under conditions of demand for lapping compound, the system functions similar to conventional systems in that the pump 48 rotates to produce flow directed through the flow valve 62 to the discharge nozzle 68 in the lapping chamber 66. The return lapping compound is directed by gravity through return conduit 72 to the vessel 40. The flow of the lapping compound coupled with the mixer 54 operated at high speeds provides enough agitation of the compound to provide adequate suspension of the solids in the fluid medium.

The machine elements involved with the gravity return of compound to the vessel 40 and the composition of the vessel itself, preferably aluminum, provide for at least enough dissipation of heat to remove excessive heat added to the compound by the internal pump slippage. To the extent that too much heat is lost, the pump speed may be increased to generate more heat to maintain the desired temperature. Although heating elements may be included in the present system, the preferred embodiment utilizes only the heat generated by the pump 48 as the source of adequate heat needed to maintain the proper compound temperature, usually about 100 degrees Fahrenheit.

When the machine is not requiring compound, such as during workpiece loading, the compound supply system assumes standby mode during which it maintains the compound at desired conditions. This is accomplished by decreasing the pump speed to a speed of about 300–900 RPM and utilizing the diverting valve 64 to promote fluid agitation, temperature consistency, and unload pressure in the pump discharge port to decrease internal pump friction. This action significantly reduces pump wear during extended periods of system operation when lapping is not occurring yet fluid maintenance is required. Service life of the pump of at least 10,000 hours is contemplated.

It is to be understood that the actual speeds of the pump may be controlled within the stated ranges (about 1200–1750 RPM for lapping and about 300–900 RPM for recirculating) to meet the temperature requirements of the supply system. For lapping or recirculating, pump speed may be increased to generate more heat if the system temperature falls below a desired level, or conversely, the speed of the pump may be decreased to generate less heat and allow the system to cool if the system temperature rises above a desired level.

The supply system of the present invention represents a significant advancement over the prior art systems in its ability to promote uniform temperature control and homogenization of the compound during periods when compound flow into the machine for the lapping process is not occurring. Prior art systems provide for some fluid control within the vessel itself, however, a significant volume of fluid is contained in the pump, valves, and interconnecting hardware in which homogenization of temperature and dispersion is not maintained at these times. The present inventive system addresses this condition by providing constant flow of compound to promote uniform heat and solids dispersion. The combined mixing action of the mixer 54 and the recirculating nozzle 76 promote complete agitation and temperature homogenization of the lapping compound in the supply system. Settling of particles from suspension and temperature differentials are substantially eliminated.

The present supply system allows for the use of a pump with a closed type of impeller which comprises vanes located on the inner surface of the impeller. The forces within such a pump are constrained within the impeller itself. Wear due to pump operation with lapping compound actually increases flow due to the polishing of impelling surfaces. Surface wear resulting in increased clearances does not produce dramatic changes in discharge flow until the impeller has completely eroded. When servicing is ultimately required, the pump wear will likely be constrained to the impeller itself, allowing for economical repair of the unit.

The present invention also contemplates a filtering means 84 to remove any metal chips in the lapping compound which may have entered the compound during the lapping process such as discussed above. Preferably, filtering means 84 comprises a series of baffle plates over which the compound may be cascaded prior to entry into the vessel 40 from return conduit 72. The cascading action decreases the velocity of the compound and allows the relatively heavy metal chips to fall from suspension and lodge between the baffle plates. The filtering means may also include a profile plate comprising a plurality of holes sized to stop the flow of metal chips but permit lapping compound to flow therethrough. Preferably, the filtering means 84 is removable for cleaning and is reusable.

The filtering means 84 may also include a sensing means, such as a float, to detect when the filtering means has reached its capacity and is in need of cleaning or replacement. The sensing means may be connected to the controls 80 of the supply system to shut down the system when the filter 84 is not capable of removing additional metal chips from the lapping compound.

Access to the vessel 40 for periodic cleaning is also improved relative to the prior art systems. The pump 48 and mixer 54 are mounted to the cover 42 by hinges, preferably counterbalanced hinges, to assist with opening the cover. Upon opening, the entire vessel 40 is accessible for maintenance.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for supplying abrasive compound to a machine tool, said apparatus comprising:
   a holding and mixing vessel, said vessel having a pair of opposed ends with each of said ends having an interior surface,
   the interior surface of one of said ends being generally conically shaped whereby the interior height of said vessel increases toward the center of said vessel,
   said vessel including a pump means being connected to an outlet conduit to convey abrasive compound from said vessel,
   said vessel including a mixing means located adjacent to said conically shaped interior surface and generally conforming therewith,
   said outlet conduit being connected to a manifold means for controlling flow of said abrasive material to at least one of said machine tool and one or more recirculating conduits,
   said one or more recirculating conduits extending from said manifold means to said vessel, said recirculating conduit being connected to at least one nozzle means to introduce abrasive compound along the conical shaped interior surface of said vessel thereby creating a swirling motion within said vessel which in combination with said mixing means maintains said abrasive compound in said vessel in a continual state of motion to keep abrasive particles in suspension in said compound and effect temperature homogenization of abrasive compound in said vessel as well as in said outlet conduit and said one or more recirculating conduits when abrasive compound is conveyed through said outlet and recirculating conduits,
   said vessel including means to receive abrasive compound from said machine tool.

2. The apparatus of claim 1 wherein said pump means comprises an impeller within the interior of said vessel and a motor located outside of said vessel.

3. The apparatus of claim 2 wherein said pump means comprises a motor with a shaft extending to said impeller, said shaft extending beyond said impeller and connecting with said mixing means.

4. The apparatus of claim 2 wherein said pump means is driven by a motor capable of variable speeds.

5. The apparatus of claim 4 wherein said pump means operates at about a first range of speeds when providing abrasive compound to said machine and at about a second range of speeds when providing abrasive compound to said recirculating conduit, said second range being less than said first range.

6. The apparatus of claim 1 wherein said pump means is a closed impeller centrifugal pump.

7. The apparatus of claim 1 wherein said nozzle means introduces abrasive compound to said vessel at an angle of orientation substantially equal to the angle of inclination of said conical surface and in a direction to effect said swirling motion and temperature homogenization within said apparatus.

8. The apparatus of claim 1 wherein said nozzle means is directed substantially tangent to a circle located midway along said conical surface.

9. The apparatus of claim 1 wherein said manifold means comprises at least first and second valve means, said first valve means controlling flow of abrasive compound from said outlet conduit to said machine tool, said second valve means controlling flow of abrasive compound from said outlet conduit to said recirculating conduit.

10. The apparatus of claim 1 further comprising a filtering means located between said vessel and said means to receive abrasive compound from said machine tool.

11. The apparatus of claim 1 wherein heat is provided to and controlled within said apparatus by the heat generated due to the operating speed of said pump means.

12. The combination of a gear finishing machine and a lapping compound supply system, said gear finishing machine being of the type wherein finish machining of the tooth surfaces of at least one work gear is facilitated at least in part by a lapping compound, said supply system comprising:
   a holding and mixing vessel, said vessel having a pair of opposed ends with the interior surface of one of said ends being generally conically shaped with the interior height of said vessel increasing toward the center of said interior surface,
   said vessel including a pump connected to an outlet conduit to convey abrasive compound from said vessel,
   said vessel including a mixing means located adjacent to said cortically shaped interior surface, said mixing means having a shape generally conforming with said conical surface,
   said outlet conduit being connected to a manifold comprising at least one valve for controlling the flow of said abrasive material to at least one of a lapping chamber of said gear finishing machine and one or more recirculating conduits,
   said one or more recirculating conduits extending from said manifold to said vessel, said recirculating conduit being connected to said vessel by at least one nozzle to introduce lapping compound along said conical shaped interior surface thereby effecting a swirling motion within said vessel which, along with said mixing means, maintains said abrasive compound in said vessel in a continual state of motion to keep abrasive particles in suspension in said compound and effects temperature homogenization of abrasive compound in said supply system when abrasive compound is conveyed through said recirculating conduit, said vessel including inlet means connected to a return conduit extending from said lapping chamber to return abrasive compound from said chamber to said vessel.

13. The apparatus of claim 12 wherein said pump comprises an impeller within the interior of said vessel and a motor located outside of said vessel.

14. The apparatus of claim 13 wherein said pump is a centrifugal closed impeller pump.

15. The apparatus of claim 13 wherein said pump comprises a motor having a shaft extending to said impeller, said shaft extending beyond said impeller and connecting with said mixing means.

16. The apparatus of claim 13 wherein said pump is driven by a motor capable of variable speeds.

17. The apparatus of claim 16 wherein said pump operates at about a first range of speeds when providing lapping compound to said gear finishing machine and at about a second range of speeds when providing lapping compound to said recirculating conduit, said second speed range being less than said first speed range.

18. The apparatus of claim 17 wherein heating of said supply system is controlled by controlling the speed of said pump within said first range and said second range.

19. The apparatus of claim 12 wherein said at least one nozzle introduces abrasive compound to said vessel at an angle of orientation substantially equal to the angle of inclination of said conical surface and in a direction along the conical surface to effect said temperature homogenization and said swirling motion about the center of the vessel.

20. The apparatus of claim 12 wherein said at least one nozzle is directed substantially tangent to a circle located midway along said conical surface.

21. The apparatus of claim 12 wherein said manifold comprises at least first and second valves, said first valve controlling flow of lapping compound from said outlet conduit to said gear finishing machine, said second valve controlling flow of lapping compound from said outlet conduit to said recirculating conduit.

22. The apparatus of claim 12 wherein heat is provided to said supply system by the heat generated due to the operation of said pump.

23. The apparatus of claim 12 wherein the other of said opposed ends comprises a hinged cover.

24. The apparatus of claim 12 further comprising a filtering means located between said vessel and said lapping chamber.

25. The apparatus of claim 24 wherein said filtering means includes sensing means for detecting the amount of material in said filtering means.

26. A method of supplying and recirculating lapping compound in a gear finishing operation, said method comprising:

providing lapping compound supply system comprising a containment vessel having opposed ends with the interior of one end being generally conically shaped whereby the interior height of said vessel is greatest in the center portion of said vessel, said vessel including a pump communicating with an outlet conduit for conveying lapping material from said vessel, said vessel including a mixing means located adjacent to said conical shaped interior surface and generally conforming therewith, said outlet conduit communicating with at least one valve means for supplying lapping material to at least one of a lapping chamber in said machine and one or more recirculating conduits, said recirculating conduit communicating with said vessel in a manner to introduce lapping compound along said conical surface to effect a swirling motion within said vessel which in combination with said mixing means maintains said abrasive compound in said vessel in a continual state of motion to keep abrasive particles in suspension in said compound and provide temperature homogenization in the lapping compound in said supply system, pumping lapping compound from said vessel at about a first range of pumping speeds through said at least one valve means to said lapping chamber and onto at least one workpiece to be lapped, lapping said at least one workpiece, terminating flow to said lapping chamber and directing flow to said recirculating conduit at said at least one valve means, pumping lapping compound at about a second range of pumping speeds less than said first range of pumping speeds through said recirculating conduit to said vessel, whereby lapping compound is introduced into said vessel at an orientation along said conical surface to effect said swirling motion which, along with said mixing means, effects said temperature homogenization and said continual state of motion to keep abrasive particles in suspension in said compound.

27. The method of claim 26 further including the step of heating said supply system by controlling the speed of said pump within said first and second ranges, the heat provided to said supply system being generated from the operation of said pump.

28. A method of mixing lapping compound and homogenizing the temperature thereof in a containment vessel, said method comprising:

providing a generally conical surface at one interior end of said vessel with an mixing means located adjacent thereto, said mixing means having a shape generally conforming with said conical surface, providing an inlet means to said vessel, said inlet means being oriented to effect flow of lapping compound along said conical surface in a manner to effect a generally swirling motion about the center of said vessel, rotating said mixing means and introducing lapping compound through said inlet means whereby along with said swirling motion, lapping compound in said vessel is maintained in a continual state of motion to keep abrasive particles in suspension in said compound and the temperature thereof is homogenized.

29. The method of claim 28 wherein said introducing through said inlet means is effected by a pump and wherein said method further includes the step of heating said vessel by controlling the speed of said pump, the heat provided to said vessel being generated from the operation of said pump.

* * * * *